United States Patent
Baumeler et al.

(10) Patent No.: US 10,476,260 B2
(45) Date of Patent: Nov. 12, 2019

(54) OVER-VOLTAGE AND GROUND FAULT PROTECTION FOR BUS CONNECTORS

(71) Applicant: Siemens Schweiz AG, Zurich (CH)

(72) Inventors: Marcel Baumeler, Rothenburg (CH); Peter Christen, Ennetbuergen (CH)

(73) Assignee: SIEMENS SCHWEIZ AG, Zurich (CH)

( * ) Notice: Subject to any disclaimer, the term of this patent is extended or adjusted under 35 U.S.C. 154(b) by 387 days.

(21) Appl. No.: 15/489,119

(22) Filed: Apr. 17, 2017

(65) Prior Publication Data

US 2017/0324237 A1     Nov. 9, 2017

(30) Foreign Application Priority Data

May 3, 2016   (EP) ..................................... 16167993

(51) Int. Cl.
*H02H 7/20*      (2006.01)
*H02H 3/16*      (2006.01)
(Continued)

(52) U.S. Cl.
CPC ................ *H02H 7/20* (2013.01); *H02H 3/16* (2013.01); *H02H 3/207* (2013.01); *H02H 9/045* (2013.01); *H02H 9/046* (2013.01); *H02M 7/06* (2013.01)

(58) Field of Classification Search
CPC ............ H02H 7/20; H02H 7/06; H02H 9/045; H02H 9/046; H02H 3/207
(Continued)

(56) References Cited

U.S. PATENT DOCUMENTS

2001/0021091 A1   9/2001  Weichler .......................... 361/58
2005/0041350 A1   2/2005  Horng et al. ................. 361/91.1
(Continued)

FOREIGN PATENT DOCUMENTS

DE       19964097 A1    7/2001   ............... H02H 3/20
EP        2677616 A1   12/2013   ............. H02H 3/087

OTHER PUBLICATIONS

Extended European Search Report, Application No. 17165401.5, 10 pages, dated Oct. 19, 2017.
(Continued)

*Primary Examiner* — Dharti H Patel
(74) *Attorney, Agent, or Firm* — Slayden Grubert Beard PLLC

(57) ABSTRACT

The present disclosure relates to a circuit providing protection against ground faults and over-voltages. The teachings thereof may be embodied in circuits including a first USB VBUS terminal; a first USB data terminal; a second USB VBUS terminal; a second USB data terminal; a VBUS line coupling the USB VBUS terminals; a data line coupling the USB data terminals; an interrupter arranged in the VBUS line or in the data line; a control circuit controlling the interrupter, comprising a breakdown member defining a first threshold voltage and a first comparison member to compare a voltage at the first USB VBUS terminal to a second threshold voltage, wherein the breakdown member connects to the first USB VBUS terminal and the switch generates an interrupt signal if: a voltage at the first USB VBUS terminal causes a voltage drop over the breakdown member exceeding the first threshold voltage, or a voltage at the first USB VBUS terminal causes a voltage applied to the first comparison member less than the second voltage threshold.

15 Claims, 6 Drawing Sheets

(51) Int. Cl.
*H02H 3/20* (2006.01)
*H02H 9/04* (2006.01)
*H02M 7/06* (2006.01)

(58) Field of Classification Search
USPC .................................................. 361/91.1
See application file for complete search history.

(56) References Cited

U.S. PATENT DOCUMENTS

2008/0186644 A1    8/2008  Migliavacca ................... 361/86
2012/0250204 A1*  10/2012  Wada ..................... H02H 3/207
                                                         361/86
2013/0107409 A1    5/2013  Mcgee et al. ................. 361/91.1
2013/0335864 A1   12/2013  Trecarichi et al. ............. 361/36
2016/0336741 A1*  11/2016  Chen ..................... H02J 7/0029

OTHER PUBLICATIONS

Chinese Office Action, Application No. 201710300579.7, 6 pages, dated Sep. 5, 2018.
Extended European Search Report, Application No. 16167993.1, 11 pages, dated Dec. 20, 2016.

* cited by examiner

OVER-VOLTAGE AND GROUND FAULT PROTECTION FOR BUS CONNECTORS

CROSS-REFERENCE TO RELATED APPLICATIONS

This application claims priority to EP Application No. 16167993.1 filed May 3, 2016, the contents of which are hereby incorporated by reference in their entirety.

TECHNICAL FIELD

The present disclosure relates to a circuit providing protection against ground faults and over-voltages. The teachings thereof may be embodied in circuits for use with an IEEE 1394 or universal serial bus compliant network of devices and/or controllers for a heating, ventilation, and air conditioning (HVAC) system with protection circuitry.

BACKGROUND

Computers and other peripheral devices often connect to one another through universal serial bus (USB) or IEEE 1394 cables and connectors. These cables and connectors are known as versatile interfaces for data transmission. They may be employed in conjunction with controllers for HVAC systems, burners, fuel cells, cogeneration (combined heat and power) plants, etc.

USB cables commonly provide a pair of leads for data transmission. They are labeled D+ and D− throughout this disclosure. The nominal operating range of the D+ and D− leads is 0-3.6 V. They ought to remain undamaged up to the 4.4 V-5.25 V range when shorted to an overvoltage condition. In addition to the wires for data transmission, another pair of leads is provided to supply power. These leads are labeled VBUS and GND throughout this disclosure. The VBUS lead typically operates at voltages of 5 V DC whereas the GND lead of the system may connect to earth. The D+, D−, VBUS, and GND leads form a total of four leads in a standard (USB) cable.

Transceiver interface circuitry such as USB circuitry or IEEE 1394 circuitry is prone to damage due to electrostatic discharge (ESD). Actually, electrostatic discharges may cause damage not only to the interface circuitry but also to any computing or electronic devices connected thereto. Due to triboelectric charging, electrostatic discharges are omnipresent and inhibition of and/or protection from any adverse effects on electronic circuitry is crucial. Electrostatic discharges generally occur when two objects come into contact after a build-up of electrostatic charge. These discharges typically decay within 100 microseconds. In spite of short duration, electrostatic discharges are known to cause damage to electronics equipment even at peak voltages as low as 50 V.

Transceiver interface circuitry such as USB circuitry or IEEE 1394 circuitry is also prone to damage due to ground faults. Normally, the plugs and the sockets of a USB cable connection are mechanically arranged so as to inhibit ground faults. Ground faults may still occur, however, e.g., between pairs of computing devices connected via a USB cable. If each controller is supplied by transformer and the windings of those transformers connect terminals with opposite polarities to ground, the ground potentials of these devices will be unbalanced. A cable or a lead connecting the ground potentials of the two computing devices may then short-circuit the different ground potentials. A short-circuit along the leads of the cable may entail currents and/or current surges that jeopardize the inner components of the computing devices such as (MOSFET) transistors, capacitors, universal asynchronous receiver/transmitter circuits, etc.

A ground fault may not only result in excessive currents along the GND lead of a cable or connector. A ground fault may also cause an abnormal voltage drop between the VBUS lead at the first end of a connection and the GND lead at the second end of the connection. It is then desirable to break any current along the VBUS lead in order that the VBUS terminals at either side of the cable are disconnected. In addition, the D+ and the D− leads between either side of the connection should be interrupted. The electrical disconnection between the terminals inhibits adverse effects of excessive voltages and/or currents on (parts of) the circuitry.

From an electrical point of view, it is desirable to first establish a connection between the GND terminals on either side of a cable connection. The D+ and D− leads for data connection are subsequently connected. The plugs and the connectors used in the connection may, however, be dirty or defective. If the connections between the terminals on either side do not connect in sequence, abnormal currents may result. Those abnormal currents may impair the quality of the data connection and/or cause damage to the (transceiver interface) circuitry.

Document US2012/250204A1 was published on 4 Oct. 2012. US2012/250204A1 discloses a protection circuit and an input/output circuit. US2012/250204A1 describes a solution with separate switches CP1 and CP2. First switch CP1 produces an interruption signal when the voltage of a VBUS line exceeds a threshold. Second switch CP2 produces an interruption signal when the voltage of a VBUS line is below another threshold.

Document US2008/186644A1 was published on 7 Aug. 2008. US2008/186644A1 teaches a method of forming an over-voltage protection circuit and structure therefore. US2008/186644A1 teaches a first circuit 28 and a second circuit 41.

Document US2013/107409A1 was published on 2 May 2013. Also, US2013/107409A1 discloses a device and a process for protection against excessive voltage and/or current in systems having USB connections and the like.

Yet another document EP2677616A1 was published on 25 Dec. 2013. EP2677616A1 teaches an interface unit comprising an overcurrent and overvoltage protection device.

SUMMARY

The teachings of the instant disclosure may be used at least to mitigate the aforementioned difficulties and to provide protective circuits for building automation devices that meet the aforementioned requirements. For example, the teachings may be embodied in a protection circuit comprising: a first USB VBUS terminal (1a) configured to couple to an USB VBUS terminal of a first controller, at least a first USB data terminal (2a, 3a) configured to couple to an USB data terminal of a first controller, a second USB VBUS terminal (1b) configured to couple to an USB VBUS terminal of a second controller, at least a second USB data terminal (2b, 3b) configured to couple to an USB data terminal of a second controller, a VBUS line electrically coupling the first USB VBUS terminal (1a) and the second USB VBUS terminal (1b), at least a data line electrically coupling the at least a first USB data terminal (2a, 3a) and the at least a second USB data terminal (2b, 3b), at least an interrupter (15a-17b) arranged in the VBUS line or in the at least a data line, wherein operation of the at least an interrupter (15a-17b) electrically interrupts the VBUS line or the at least a data line, a control circuit (10) with a switch (35), the control circuit (10) being electrically connected to the first USB VBUS terminal (1a) and controlling via the switch (35) the at least an interrupter (15a-17b), wherein the switch (35) is operable to generate an interrupt signal to cause operation of the at least an interrupter (15a-17b), wherein the control circuit (10) comprises first branch (35-38, 1a) with a breakdown member (38) defining a first threshold voltage and a second branch (35, 40, 42, 43, 1a) with a first comparison member (40, 42) configured to compare a voltage at the first USB VBUS terminal (1a) to a second threshold, the two branches connecting to the first USB VBUS terminal (1a), characterized in that the breakdown member (38) connects directly to the first USB VBUS terminal (1a) and in that the same switch (35) will generate an interrupt signal, if a voltage at the first USB VBUS terminal (1a) causes a voltage drop over the breakdown member (38) exceeding the first threshold voltage, or if a voltage at the first USB VBUS terminal (1a) causes a voltage applied to the first comparison member (40, 42) that is less than the second threshold.

In some embodiments, the first controller and/or the second controller comprises a step-down converter configured to produce a supply voltage, the protection circuit additionally comprising: a supply terminal (6) configured to connect to the step-down converter, the control circuit (10) further comprising: a third branch (6, 41, 39, 43, 35), the third branch (6, 41, 39, 43, 35) being electrically connected to the supply terminal (6), the third branch also comprising a second comparison member (41, 39) configured to compare a voltage applied at the supply terminal (6) to a third threshold, wherein the switch (35) is also operable to generate an interrupt signal, if a voltage at the supply terminal (6) causes a voltage applied to the second comparison member (41, 39) that is less than the third threshold.

In some embodiments, there is a power terminal (5d) configured to connect to a power supply of the first controller and/or to a power supply of the second controller, the control circuit (10) further comprising: a divider circuit (5d, 44, 43, 39, 40, 35), the divider circuit (5d, 44, 43, 39, 40, 35) being electrically connected to the power terminal (5d), the divider circuit (5d, 44, 43, 39, 40, 35) being configured to produce a voltage that is a fraction of a voltage at the power terminal (5d), wherein the switch (35) is also a comparison member configured to compare the voltage produced by the divider circuit (5d, 44, 43, 39, 40, 35) to a fourth threshold, wherein the switch (35) will also generate an interrupt signal, if a voltage at the power terminal (5d) causes the divider circuit (5d, 44, 43, 39, 40, 35) to produce a voltage that exceeds the fourth threshold.

In some embodiments, the at least an interrupter (15a-17b) is configured to close, and wherein closing the at least an interrupter (15a-17b) makes an electrical connection along the VBUS line or along the at least a data line, the protection circuit additionally comprising: at least a power terminal (5a-5c) configured to connect to a power supply of the first controller and/or to a power supply of the second controller, a time delay circuit (5a-5c, 32-34, 20b, 21b, 22b, 31) with a resistive member (31) and with at least a capacitive member (32-34), the time delay circuit being electrically connected to the at least a power supply terminal (5a-5c), the time delay circuit (5a-5c, 32-34, 20b, 21b, 22b, 31) being configured to produce within a first time delay a fifth threshold voltage (18a-18c) that causes the at least an interrupter (15a-17b) to close, wherein the first time delay is a function of the resistive member (31) and of the at least a capacitive member (32-34).

In some embodiments, there is a first GND terminal (4a) configured to connect to a GND line of the first controller, at least a second GND terminal (4b1-4b11) configured to connect to a GND line of the second controller, a GND line electrically coupling the first GND terminal (4a) and the at least a second GND terminal (4b1-4b11), a resettable device (24) arranged in the GND line, wherein the resettable device (24) has a first state and a second state, wherein the impedance of the resettable device (24) in its first state is larger than in its second state, wherein the resettable device (24) is configured to change from its second state to its first state in response to an increase in electric current through the GND line.

In some embodiments, there is a ground fault detection circuit (9) with at least a second switch (26, 28), the ground fault detection circuit (9) controlling via the at least a second switch (26, 28) the at least an interrupter (15a-17b), wherein the at least an interrupter (15a-17b) is configured to electrically interrupt in response to the at least a second switch (26, 28) closing, wherein the resettable device (24) controls the at least a second switch (26, 28) of the ground fault detection circuit (9), wherein the at least a second switch (26, 28) is configured to close in response to the resettable device (24) changing into its first state.

In some embodiments, the resettable device (24) is configured to change from its first state to its second state in response to a decrease in electric current through the GND line.

In some embodiments, there is at least an electrostatic discharge circuit (7a; 7b) with an at least a phase end terminal and at least a ground terminal, the at least a phase end terminal connecting to at least one of: the first USB VBUS terminal (1a), the second USB VBUS terminal (1b), the at least a first USB data terminal (2a, 3a), the at least a second USB data terminal (2b, 3b), the at least a ground terminal of the electrostatic discharge circuit (7a, 7b) connecting to at least one of: the first GND terminal (4a), the at least a second GND terminal (4b9; 4b4, 4b5), the electrostatic discharge circuit (7a; 7b) additionally comprising a rectifier circuit (11a-11d; 13a-13f) connected to the at least a phase end terminal and comprising at least a breakdown member (12; 14a-14b) connected to the at least a ground terminal of the electrostatic discharge circuit (7a; 7b), the at least a breakdown member (12; 14a-14b) defining a sixth threshold voltage, wherein the rectifier circuit (11a-11d; 13a-13f) is configured to produce a rectified voltage in response to a voltage applied to the at least a phase end terminal and is configured to apply the produced rectified voltage to the at least a breakdown member (12; 14a-14b), wherein the at least a breakdown member (12; 14a-14b) is configured to change from a first state with a first impedance to a second state with a second impedance, the second impedance being lower than the first impedance, in response to the voltage applied by the rectifier circuit (11a-11d; 13a-13f) to the at least a breakdown member (12; 14a-14b) exceeding the sixth threshold voltage.

In some embodiments, the at least an electrostatic discharge circuit (7a) additionally comprises: at least another breakdown member (14b, 14a) connected to the at least a ground terminal of the electrostatic discharge circuit (7a), the at least another breakdown member (14b, 14a) defining a seventh threshold voltage, wherein the rectifier circuit (13a-13f) is configured to produce a rectified voltage in response to a voltage applied to the at least a phase end terminal and is configured to apply the produced rectified voltage to the at least another breakdown member (14b, 14a), wherein the at least another breakdown member (14b, 14a) is configured to change from a first state with a first impedance to a second state with a second impedance, the second impedance being lower than the first impedance, in response to the voltage applied by the rectifier circuit (13a-13f) to the at least a breakdown member (14b, 14a) falling below the seventh threshold voltage.

In some embodiments, the first threshold voltage is larger than the second threshold.

In some embodiments, the switch (35) of the control circuit (10) controls the voltage produced by the time delay circuit (5a-5c, 32-34, 20b, 21b, 22b, 31), wherein the time delay circuit (5a-5c, 32-34, 20b, 21b, 22b, 31) is configured to drop within a second time delay its output voltage to a value below the fifth threshold voltage in response to the switch (35) of the control circuit (10) generating an interrupt signal, wherein the at least an interrupter (15a-17b) is configured to electrically interrupt in response to a voltage produced by the time delay circuit (5a-5c, 32-34, 20b, 21b, 22b, 31) that is below the fifth threshold voltage.

In some embodiments, the second time delay is shorter than the first time delay.

In some embodiments, the second time delay is independent of the resistive member (31) and is independent of the at least a capacitive member (32-34).

In some embodiments, the first comparison member (40, 42) of the control circuit (10) itself defines the second threshold.

The teachings may be embodied in a system of networked device with the first controller and with the second controller and with a protection circuit as described above, wherein the first controller provides an USB VBUS terminal and at least an USB data terminal, wherein the second controller provides an USB VBUS terminal and at least an USB data terminal, wherein the first USB VBUS terminal (1a) of the protection circuit couples to the USB VBUS terminal of the first controller, wherein the second USB VBUS terminal (1b) of the protection circuit couples to the USB VBUS terminal of the second controller, wherein the at least a first USB data terminal (2a, 3a) of the protection circuit couples to the at least an USB data terminal of the first controller, wherein the at least a second USB data terminal (2b, 3b) of the protection circuit couples to the at least an USB data terminal of the second controller.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
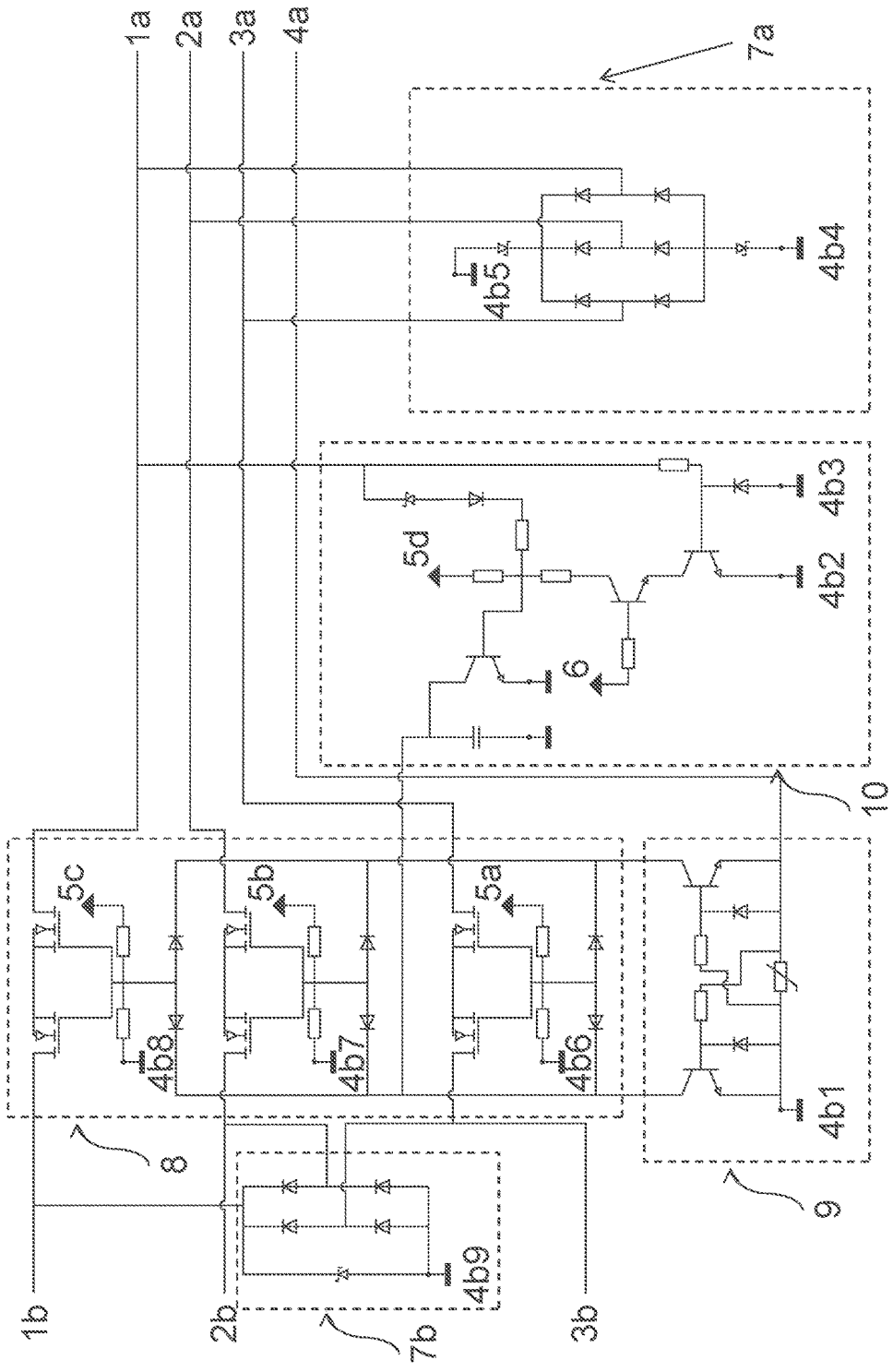
FIG. 1 depicts a circuit diagram of a protection circuit according to the instant disclosure.

The present disclosure may enable a protection circuit for use with a 1394-compliant and/or USB-compliant network of devices. The protection circuit may mitigate issues related to ground faults. A protection circuit incorporating teachings of the instant disclosure may be embodied as part of a cable connection between two computing devices.

To inhibit issues related to ground faults, the protection circuit in such embodiments provides a resettable device connected between the GND terminals on either side of the connection. The resettable device checks for excessive currents and/or for excessive voltage drop along the GND lead. Normal currents and/or normal voltage drop indicates that the ground potentials are balanced.

The circuit does not connect the VBUS terminals on either side of the bus unless the potential of the VBUS terminal exceeds a threshold. The protection circuit is also adapted to look for a VBUS terminal with an excessive potential. To that end, the protective circuit comes with another threshold that is higher than the above-mentioned threshold. The circuit of the instant disclosure is operable to throw at least a switch if the potential of a VBUS terminal exceeds the other threshold.

Embodiments of the present disclosure may provide a circuit that offers protection against electrostatic discharges.

Embodiments of the present disclosure may provide a circuit that offers protection against electrostatic discharges and at the same time inhibits short-circuit conditions between a VBUS, D+, and/or D− terminal and earth in case of a ground fault.

Embodiments of the present disclosure may provide a protection circuit wherein the VBUS, D+, and D− terminals on either side of the bus connect upon application of a supply voltage to a controller.

Embodiments of the present disclosure may provide a protection circuit wherein the connection of the VBUS, D+, and D− terminals on either side of the bus depends on the voltage supplied to a microcontroller of a controller.

Embodiments of the present disclosure may provide a protection circuit with a resistive member. The resistive member introduces a delay between the application of a supply voltage and the connection of the VBUS, D+, and D− terminals on either side of the bus connector.

Embodiments of the present disclosure may provide a protection circuit that operates quickly, in particular more quickly than the aforementioned delay, whenever the potential of a VBUS terminal exceeds a pre-determined threshold.

Embodiments of the present disclosure may provide a protection circuit that offers protection from inrush currents.

Embodiments of the present disclosure may provide a protection circuit that achieves protection against ground faults without galvanic isolation.

Embodiments of the present disclosure may provide a resettable protection circuit. In other words, the protection circuit as disclosed hereinafter may not be single use.

Embodiments of the present disclosure may provide a protection circuit that is inexpensive to manufacture, especially adapted for economical manufacture by large-scale production, and durable in construction.

Embodiments of the present disclosure may provide a protection circuit that comes as an integrated circuit.

Embodiments of the present disclosure may provide a controller for a HVAC installation, wherein the controller has a protection circuit according to this disclosure.

Embodiments of the present disclosure may provide a USB cable with a protection circuit according to this disclosure.

Embodiments of the present disclosure may provide a HVAC installation with a protection circuit according to this disclosure.

In FIG. 1, the reference numerals 1a, 2a, 3a, 4a stand for terminals of the protection circuit that connect to a first controller. In some embodiments, the first controller is a USB host. The terminal 1a functions to connect the protection circuit to the VBUS terminal of the first controller. The terminals 2a and 3a connect to the D− and D+ terminals of the first controller, respectively. The connection to ground is labeled 4a.

The reference numerals 1b, 2b, 3b, 4b1-4b9 stand for terminals that connect to a second controller. In some embodiments, the second controller is a USB device. The terminal 1b functions to connect the protection circuit to the VBUS terminal of the second controller. The terminals 2b and 3b connect to the D− and D+ terminals of the second controller. The connections to ground are labeled 4b1-4b9. The protection circuit is arranged in between the first group of terminals 1a, 2a, 3a, 4a and the second group of terminals 1b, 2b, 3b, 4b1-4b9. The protection circuit may, by way of non-limiting example, come as part of the transceiver interface circuitry of the second controller.

Terminals 5a-5d connect to a supply voltage of the second controller such as 24 V DC. The protection circuit thus connects to the supply voltage of the second controller. Due to the terminals 5a-5d, the protection circuit will allow data transmission between the controllers only if the second controller is supplied with (DC) power. The person with ordinary skill readily understands that technical limits apply to the voltage supplied through terminals 5a-5d.

Terminal 6 connects to a supply voltage of a microprocessor (or similar) of the second controller. Microprocessors are typically supplied with voltages such as 3.3 V. The skilled person readily understands that terminal 6 can connect to any suitable voltage supply such as a microcomputer supply or to the secondary terminals of a 24 V/3.3 V step-down converter.

Due to terminal 6, the protection circuit is operable to look for a voltage on that terminal. The protection circuit enables data transmission only if a voltage is applied to terminal 6. The person with ordinary skill readily understands that technical limits apply to the voltage supplied through terminal 6.

The protection circuit as shown on FIG. 1 can be divided into a plurality of circuits 7a, 7b, 8, 9, and 10. Circuits 7a and 7b are operable to protect from electrostatic discharges. Circuit 8 functions to interrupt the VBUS, D−, and D+ leads. Circuit 9 is provided to check for excessive voltage drop and/or excessive current along the GND lead. Circuit 10 is operable to monitor the potential of the VBUS leads and to check whether a voltage is supplied by terminal 6.

Figure 2:
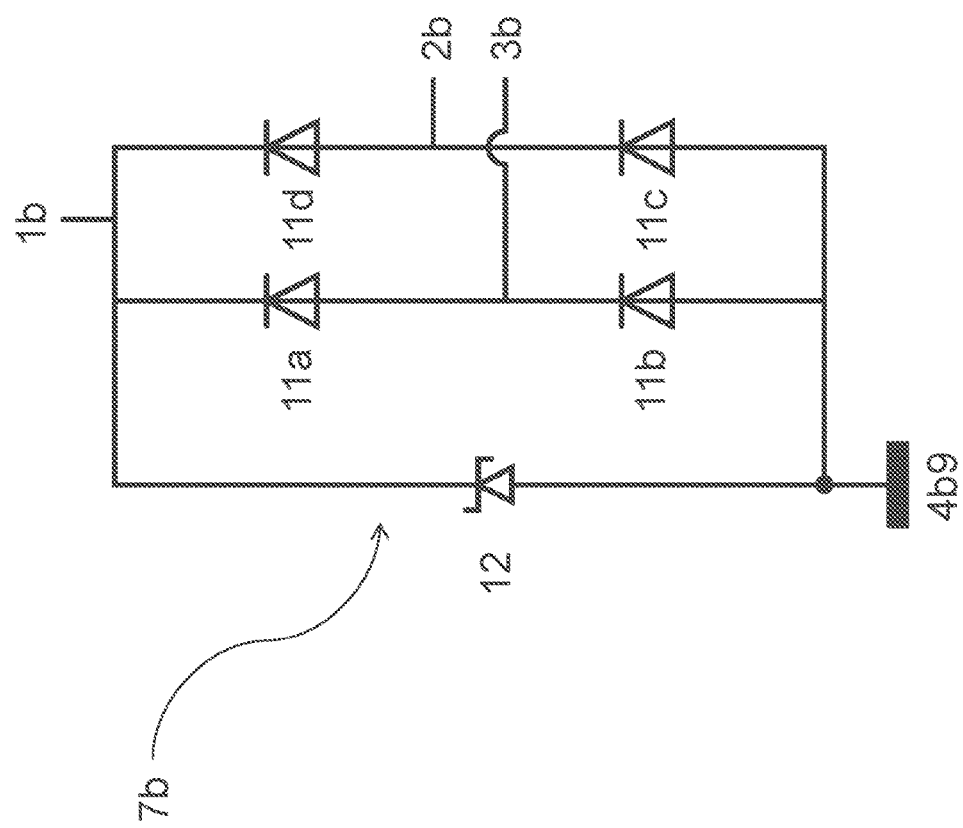
FIG. 2 is a circuit diagram with details of an ESD protective circuit.

Referring now to FIG. 2, the circuit 7a is shown in detail. The ESD protection circuit 7b is disposed near the terminals 1b, 2b, 3b, 4b1-4b9 connecting the circuit of FIG. 1 to the second controller. The ESD protection circuit 7b connects to the VBUS lead 1b of the second controller, to the D− lead 2b of the second controller, to the D+ lead 3b of the second controller, and to ground 4b9.

The circuit 7b comprises a plurality of rectifiers 11a-11d as well as a shunt regulator 12. The shunt regulator 12 may, by way of non-limiting example, be implemented as a Zener diode. The skilled person selects a suitable breakdown voltage such that the circuit 7b offers effective protection against electrostatic discharges.

The skilled person also selects a suitable breakdown voltage such that the ESD protection circuit 7b does not short-circuit any of the leads VBUS 1b, D− 2b, and/or D+ 3b to GND 4a9. The skilled person selects a shunt regulator 12 with a breakdown voltage that is sufficient to inhibit disturbances along the bus. The skilled person also selects a shunt regulator 12 such that currents between VBUS and GND are inhibited during normal operation. The breakdown voltage of the shunt regulator may, by way of non-limiting example, be 6 V.

The rectifiers 11a-11d may be implemented as semiconductor diodes. The rectifiers 11a-11d maintain the D− and D+ leads 2b, 3b at potentials such as 3.3 V lower than the potential of the VBUS lead 1b. Rectifiers are also arranged in between the D− and D+ leads 2b, 3b and separate the potentials of these leads.

In the event of an excessive voltage on the VBUS lead 1b, the breakdown voltage of the shunt regulator 12 can be exceeded. The impedance of the shunt regulator 12 then drops and the excessive voltage of the VBUS lead 1b is lead to ground 4b9. The potential of the VBUS lead 1b consequently drops to a value below the breakdown voltage of the shunt regulator 12.

The circuit 7b also protects the leads D− 2b and D+ 3b from excessive voltages. The rectifier 11d has a first node in the direction of the lead 2b and a second node in the direction of the shunt regulator 12. In the event of an excessive voltage along the D− lead 2b, the rectifier 11d transfers the potential from its first node to its second node. As soon as the potential of the second node exceeds the breakdown voltage of the shunt regulator 12, a current flows from the D− lead 2b to ground 4b9. The potential of the D− lead 2b then drops to a value below the breakdown voltage of the shunt regulator 12 plus the forward voltage of rectifier 11d.

Similar considerations apply to the D+ lead 3b. The rectifier 11a in conjunction with the shunt regulator 12 connects an excessive potential along the lead 3b to ground 4b9. In other words, the circuit 7b effectively limits the potentials of the leads 1b, 2b, and 3b to the breakdown voltage of the shunt regulator 12 (plus the forward voltages of the rectifiers 11a-11d). A typical value of a forward voltage of a rectifier 11a-11d is 0.6 V. The diodes 11b, 11c also inhibit any adverse effects of negative voltages applied to leads 2b, 3b.

Figure 3:
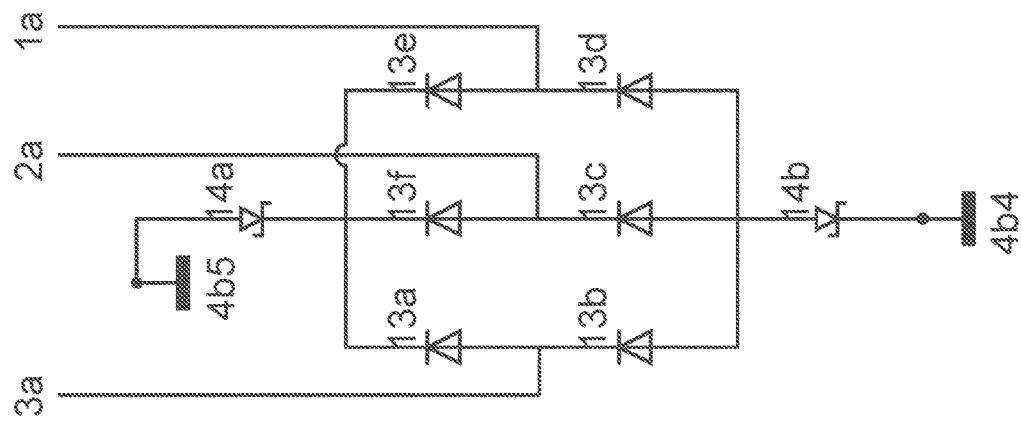
FIG. 3 is a circuit diagram with details of another ESD protective circuit.

FIG. 3 provides details of the example ESD protective circuit 7a. The ESD protection circuit 7a is disposed near the terminals 1a, 2a, 3a, 4a connecting the circuit of FIG. 1 to the first controller. The ESD protection circuit 7a connects to the VBUS lead 1a of the first controller, to the D− lead 2a of the first controller, to the D+ lead 3a of the first controller, and to the ground 4b9 of the second controller.

The circuit 7a provides a plurality of rectifiers 13a-13f as well as two regulators 14a, 14b. According to an aspect, at least one regulator 14a or 14b is implemented as Zener diodes. According to another aspect, both regulators 14a and 14b are implemented as a Zener diode.

The skilled person selects a suitable breakdown voltage such that the circuit 7a offers effective protection against electrostatic discharges. The skilled person also selects a suitable breakdown voltage such that the ESD protective circuit 7a does not short-circuit any of the leads VBUS 1a, D− 2a, and/or D+ 3a to GND 4b4, 4b5 in the event of a ground fault. The breakdown voltage of the regulators 14a, 14b may, by way of non-limiting example, be 47 V.

The rectifiers 13a-13f may be implemented as semiconductor diodes.

The rectifier 13e has a first node in the direction of lead 1a and a second node in the direction of regulator 14a. In the event of an excessive voltage on lead VBUS 1a, the rectifier 13e will transfer the potential of its first node to its second node.

If the potential at the second node of the rectifier 13e is larger than the breakdown voltage of the regulator 14a, the impedance of the regulator 14a will drop. An excessive voltage (e.g., due to an electrostatic discharge) along the VBUS lead 1a is then connected to ground 4b5. The potential of the VBUS lead 1a consequently drops to a value below the breakdown voltage of the regulator 14a (plus the forward voltage of the rectifier 13e).

An electrostatic discharge can be positively charged as well as negatively charged. In the event of a negative discharge, the potential of the VBUS lead 1a may take on a negative value.

Depending on its value, the negative potential can impair the transceiver interface circuitry and/or the first controller. It is thus desirable to protect the circuitry of the transceiver interface and/or of the first controller from negative electrostatic discharges. It is also desirable to protect the protection circuit, in particular switches of the protection circuit.

The circuit 7a provides a rectifier 13d as well as a regulator 14b to address the issue of negative electrostatic discharges. The rectifier 13d has a first node in the direction of the VBUS lead 1a and a second node in the direction of the regulator 14b. In the event of a sufficiently strong negative discharge, the rectifier 13d will transfer the negative potential of its first node to its second node.

If the potential at the second node is sufficiently negative, the breakdown voltage of the regulator 14b between ground 4b4 and the second node will be exceeded. The impedance of the regulator 14b will then drop. A sufficiently negative electrostatic discharge along the VBUS lead 1a is then connected to ground 4b4.

The circuit 7a also protects the D− and D+ leads 2a and 3a against positive and negative electrostatic discharges. The rectifier 13f has a first node in the direction of the lead 2a and a second node in the direction of the regulator 14a. In the event of an excessive voltage along the D− lead 2a, the rectifier 13f transfers the potential of its first node to its second node. As soon as the breakdown voltage of the regulator 14a is exceeded, a current flows from the D− lead 2a to ground 4b5. The potential of the D− lead 2a then drops to a value below the breakdown voltage of the shunt regulator 14 plus the forward voltage of rectifier 13f.

Similar considerations apply to negative electrostatic discharges into lead 2a. The rectifiers 13c and the regulator 14b then take on the roles of the rectifiers 13f and of the regulator 14a mentioned above.

Similar considerations also apply to the D+ lead 3a. The rectifier 13a in conjunction with the regulator 14a offers protection against positive electrostatic discharges. Likewise, the rectifier 14b in conjunction with the regulator 14b offers protection against negative electrostatic discharges.

In some embodiments, the protection circuit comprises an additional ESD protection circuit 7a which replaces the ESD protection circuit 7b. In other embodiments, the protection circuit comprises an additional ESD protection circuit 7b which replaces the ESD protection circuit 7a. In some embodiments, there is no ESD protection circuit 7a and/or ESD protection circuit 7b.

Figure 4:
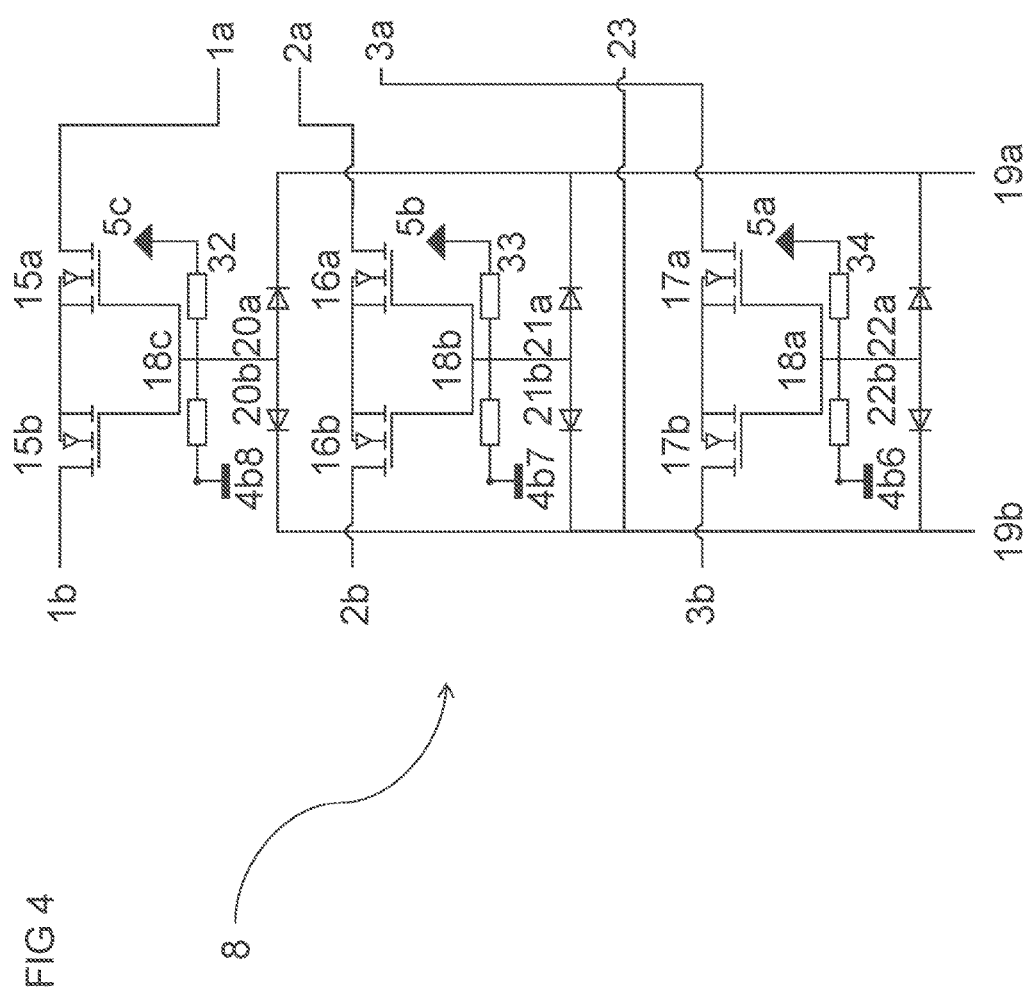
FIG. 4 is a circuit diagram with details of an interrupter circuit.

Referring now to FIG. 4, details of the interrupter circuit 8 are provided. The interrupter circuit 8 functions to make or break the electrical connections between the VBUS, D−, and D+ leads on either side of the protection circuit 1. To that end, the interrupter circuit 8 provides terminals to the VBUS lead 1a, to the D− lead 2a, and to the D+ lead 3a of the first controller. The interrupter circuit 8 also provides terminals to connect to the VBUS lead 1b, to the D− lead 2b, and to the D+ lead 3b of the second controller.

The interrupter circuit 8 provides a number of switches 15a, 15b, 16a, 16b, 17a, 17b to make or break the connections between its terminals 1a, 2a, 3a, 1b, 2b, 3b. The switches 15a and 15b make or break the connection between the VBUS terminals 1a and 1b. In some embodiments, one of the switches 15a, 15b can be dispensed with.

The switches 16a and 16b make or break the connection between the D− terminals 2a and 2b. In some embodiments, one of the switches 16a, 16b can be dispensed with. The switches 17a and 17b make or break the connection between the D+ terminals 3a and 3b. In some embodiments, one of the switches 17a, 17b can be dispensed with. The interrupter circuit shown on FIG. 4 provides no switches operable to make or break the electrical connection of the GND lead.

Switches 15a-17b may comprise semiconductor switches and/or conventional relays, depending on design requirements. In some embodiments, at least one of the switches 15a-17b is a field-effect transistor. In some embodiments, at least one of the switches 15a-17b is a metal-oxide-semiconductor field-effect (MOSFET) transistor. In some embodiments, the interrupter circuit 8 employs two metal-oxide-semiconductor field-effect transistors 15a, 15b; 16a, 16b; 17a, 17b in series per VBUS lead 1a, 1b; per D− lead 2a, 2b; and per D+ lead 3a, 3b. The use of two metal-oxide-semiconductor field-effect transistors 15a, 15b; 16a, 16b; 17a, 17b enables making or breaking currents in both directions along the leads VBUS 1a, 1b; D− 2a, 2b; and D+ 3a, 3b.

The skilled person readily selects and combines suitable elements for switches 15a-17b such as
  n-type enhancement mode MOSFETs,
  n-type depletion mode MOSFETs,
  p-type enhancement mode MOSFETs,
  p-type depletion mode MOSFETs,
  n-channel FETs
  p-channel FETSs.
The above list is non-exhaustive.

In the exemplary embodiment of FIG. 4, each of the switches 15a, 15b; 16a, 16b; 17a, 17b comprises a gate electrode. The gate electrodes of the switches 15a, 15b; 16a, 16b; 17a, 17b each connect to a resistive voltage divider. The voltage dividers connect between the supply terminals 5a-5c and the ground terminals 4b6-4b8. The voltage dividers each produce an output voltage at the gates 18a-18c of the switches 15a, 15b; 16a, 16b; 17a, 17b that is a fraction of the supply voltage. The skilled person chooses elements such as ohmic resistors of suitable resistivity such that the output voltages of the dividers match the requirements of the gate electrodes. Switches 15a, 15b; 16a, 16b; 17a, 17b may be in their conducting states when the voltages at the gate electrodes 18a-18c match the output voltages of the voltage dividers.

The gate electrodes 18a-18c via diodes 20a, 20b; 21a, 21b; 22a, 22b also connect to nodes 19a, 19b of the interrupter circuit 8. Pairs of anti-parallel diodes 20a, 20b;

21a, 21b; and 22a, 22b isolate nodes 19a and 19b from one another. If any of the nodes 19a, 19b is connected to ground, gate electrodes 18a-18c will substantially (neglecting the voltage drop over the diodes 20a, 20b; 21a, 21b; 22a, 22b) also connect to ground. Switches 15a, 15b; 16a, 16b; 17a, 17b advantageously break when the voltages at their gate electrodes substantially match ground potential.

Node 23 of interrupter circuit 8 connects to controller check circuit 10. If node 23 connects to ground, gate electrodes 18a-18c will substantially (neglecting the voltage drop over the diodes 20a, 20b; 21a, 21b; 22a, 22b) also connect to ground. Switches 15a, 15b; 16a, 16b; 17a, 17b may break when the voltages at their gate electrodes substantially match ground potential.

In some embodiments, the three voltage dividers shown on FIG. 4 are implemented in a single resistive voltage divider. In this embodiment, all gate electrodes 18a-18c connect to the output terminal of the same voltage divider. Also, the gate electrodes 18a-18c connect to nodes 19a, 19b via at least a pair of anti-parallel diodes.

Figure 5:
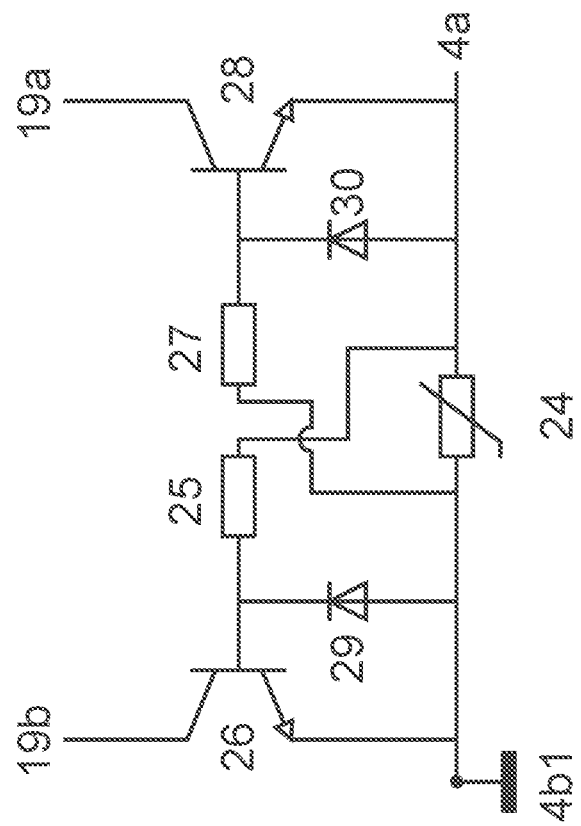
FIG. 5 is a circuit diagram with details of a ground fault circuit.

FIG. 5 provides details of a ground fault detection circuit 9. The ground fault detection circuit 9 connects to the interrupter circuit 8 via nodes 19a and 19b. The ground fault detection circuit also connects to the GND terminal of the first controller 4a and to a GND terminal of the second controller 4b1.

A resettable device 24 is interposed between the GND terminals 4a and 4b1. The resettable device 24 may make direct electrical contact with the two GND terminals 4a and 4b1. In an embodiment, the resettable device 24 is a positive temperature coefficient (PTC) element. The skilled person chooses a commercially available PTC element with a suitable reset time at room temperature (e.g., around 22 degrees Celsius). The reset time at room temperature may be in the range of seconds or lower. That way, the ground fault detection circuit 9 will reset seconds after a ground fault. The skilled person also chooses a PTC element 24 with a suitable increase in resistivity with temperature. An increase in temperature of element 24 follows the resistive losses I2 R in the PTC element 24. The resistivity of element 24 can, by way of non-limiting example, climb by a factor 2500 as temperature increases between room temperature and 150 degrees Celsius.

The resettable element 24 has a first node in the direction of GND terminal 4a and a second node in the direction of GND terminal 4b1. The first node connects via a limiter 25 to the control terminal of a switch 26. The second node of the element 24 connects via a limiter 27 to the control terminal of another switch 28. Switches 26, 28 can be implemented as semiconductor switches and/or through conventional relays, depending on design requirements. In some embodiments, at least one of the switches 26, 28 is a bipolar transistor. In some embodiments, at least one of the switches 26, 28 is a transistor of the npn-type. In some embodiments, the ground fault detection circuit 9 employs two bipolar transistors as switches 26, 28. The skilled person readily chooses available transistors 26, 28 with base terminals that withstand the voltage drop (over element 24) in the event of a ground fault.

FIG. 5 also shows two rectifiers 29, 30 operable to protect npn transistors 26, 28 against excessive voltages between their emitter and base terminals. Rectifiers 29, 30 can, by way of non-limiting example, comprise semiconductor diodes with breakdown voltages between 0.6 V and 0.7 V. It is envisioned that an embodiment with switches 26, 28 in the form of field effect transistors or relays dispenses with rectifiers 29, 30.

Limiters 25, 27 are operable to limit the currents the flow into the control terminals of switches 26, 28. The limiters 25, 27 can, by way of non-limiting example, comprise ohmic resistors. In some embodiments, both of the limiters 25, 27 are implemented as ohmic resistors.

In some embodiments, the switches 26, 28 are implemented through relays and/or through field-effect transistors. It is envisaged that an embodiment with switches in the form of relays 26, 28 and/or in the form of field-effect transistors dispenses with limiters 25, 27.

In the event of a ground fault, an excessive current between terminals 4a and 4b1 will heat resettable member 24. The resistivity of the resettable member 24 then increases rapidly. In some embodiments, the resistivity of the resettable member 24 increases by a factor 10, or even by a factor 100.

The increase in resistivity entails a voltage drop over the resettable member 24. The voltage drop over the member 24 is then led to via limiter 25 or 27 to the control terminal of the respective switch 26 or 28. As soon as switch 26 changes from its non-conducting state to its conducting state, the node 19b assumes the potential of terminal 4b1. Also, node 19a assumes the potential of terminal 4a when the switch 28 changes from its non-conducting into its conducting state. The voltages of the terminals 4b1 and 4a are then transferred to the interrupter circuit 8 via nodes 19b and 19a.

In response to the ground fault, the interrupter circuit 8 of FIG. 4 then operates (throws) switches 15a-17b. By throwing the switches 15a-17b, the terminals 1b, 2b, 3b of the second controller and 1a, 2a, 3a of the first controller are isolated from one another. Due to the voltage drop over the resettable member 24, an electric current may flow from terminal 4a via rectifier 30 and via limiter 27 to terminal 4b1. An electric current may also flow from terminal 4b1 via rectifier 29 and via limiter 25 to terminal 4a. The skilled person readily chooses suitable members 25, 27, 29, 30 that withstand currents and I2 R losses due to ground faults.

The skilled person also chooses suitable limiters 25, 27 in accordance with applicable regulation. In particular, the skilled person employs limiters 25, 27 that comply with upper limits of resistivity between terminals 4a and 4b1.

Figure 6:
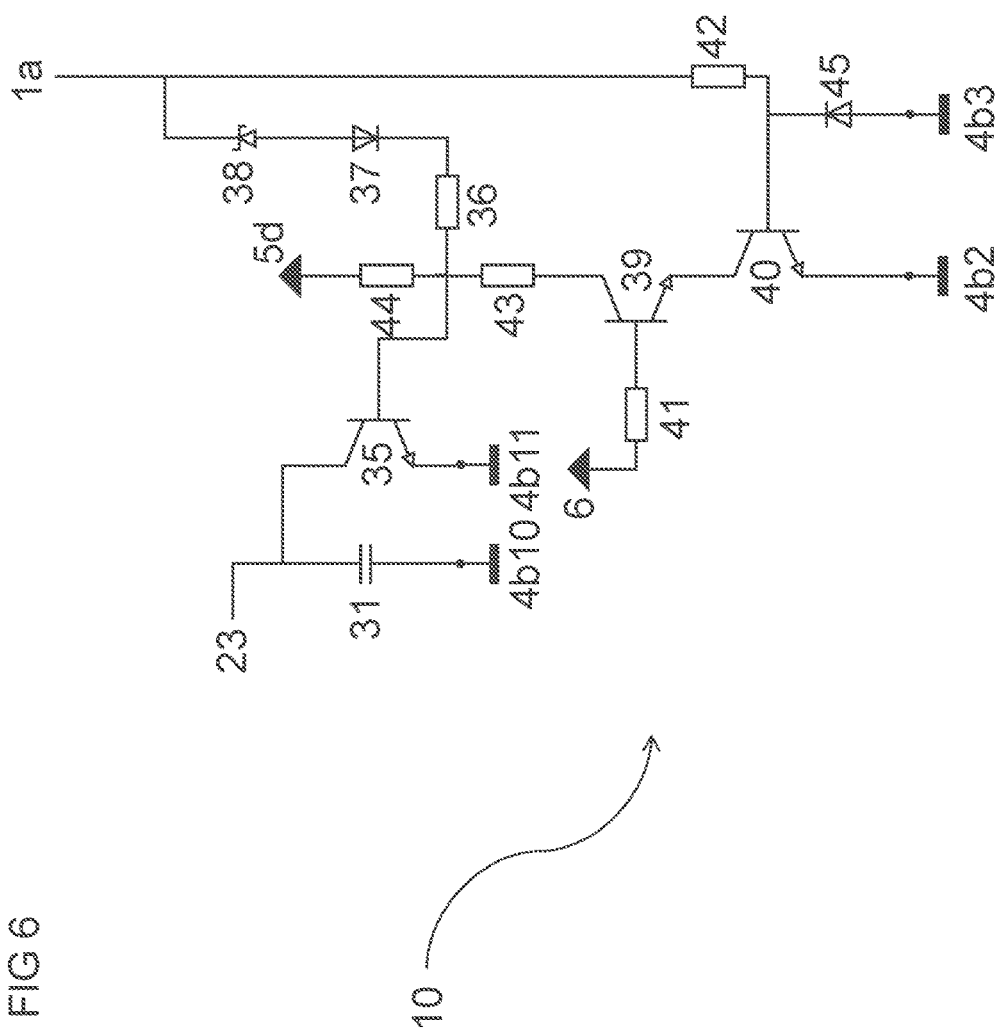
FIG. 6 is a circuit diagram with details of a controller check circuit.

In FIG. 6, the reference numerals 4b2, 4b3, 4b10, and 4b11 stand for terminals of the controller check circuit 10 that connect to the ground potential of the second controller. Controller check circuit 10 also connects to a supply voltage of a controller device via terminal 5d. Terminal 5d may connect to the supply voltage of the second controller. In some embodiments, terminal 5d connects to the supply voltage of the first controller.

Controller check circuit 10 further connects to a microprocessor (or similar) supply voltage through terminal 6. Terminal 6 may connect to a microprocessor (or similar) supply voltage provided by the second controller. In some embodiments, terminal 6 connects to a microprocessor (or similar) supply voltage provided by the first controller.

Node 23 connects controller check circuit 10 to interruption circuit 8. Controller check circuit 10 provides a resistive member 31 disposed between node 23 and ground 4b10. Delay member 31 is preferably implemented as a capacitor. In some embodiments, delay member 31 is an electrolyte capacitor.

Delay member 31 in conjunction with resistors 32-34 of the interruption circuit 8 forms a resistive capacitive (RC) circuit. The delay member 31 of the resistive capacitive circuit shown on FIGS. 4 and 6 is charged via the supply voltage 5a, 5b, 5c of a controller. In other words, the delay member 31 will not charge unless terminals 5*a*, 5*b*, and 5*c* of the interruption circuit connect to a voltage supply.

In some embodiments, the terminals 5*a*, 5*b*, and 5*c* of the interruption circuit 8 are combined into a single terminal. The resistors 32, 33, 34 of the resistive voltage dividers of interruption circuit 8 are also combined into a single resistor.

The skilled person chooses resistive and capacitive members in accordance with a suitable time constant of the resistive capacitive circuit. The time constant of the resistive capacitive circuit may be in the range of seconds or lower. In some embodiments, the time constant is less than a second.

The time constant of the resistive capacitive circuit determines a time delay upon connection of the two controllers. Switches 15*a*-17*b* of the interruption circuit 8 become conducting when the potentials at their control terminals are sufficiently different from ground potential. That is, the delay member 31 needs to be charged to a predetermined degree in order for the switches 15*a*-17*b* to close. There can be no connection between the terminals 1*a*, 2*a*, 3*a* of the first controller and the terminals 1*b*, 2*b*, 3*b* of the second controller until the delay member 31 is sufficiently charged.

The delay introduced by delay member 31 inhibits adverse effects of any inrush currents into the VBUS, D−, and D+ leads of the connecting cable. The delay member 31 also yields a reset time. It will take at least until the delay member 31 is fully charged to re-establish a connection whenever a cable has been unplugged. Switch 35 of controller check circuit 10 is arranged in parallel to delay member 31. In some embodiments, the resistivity along the parallel path is low when the switch 35 closes. Switch 35 enables a quick discharge of delay member 31, thereby setting the potential of node 23 to ground potential. Operation of switch 35 causes switches 15*a*-17*b* to break, thereby allowing for fast interruption of the VBUS lead 1*a*, 1*b*, of the D− lead 2*a*, 2*b*, and of the D+ lead 3*a*, 3*b*.

Switch 35 may operate due to an excessive voltage on the VBUS terminal 1*a* of the first controller. The VBUS terminal 1*a* connects to the control node of switch 35 via VBUS regulator 38, via rectifier 37, and via limiter 36. If a voltage is applied to terminal 1*a* that exceeds the breakdown voltage of voltage regulator 38, that voltage will be applied to the control node of switch 35. The voltage applied to the control node of switch 35 causes switch 35 to operate. Consequently, switch 35 becomes conducting, thereby quickly discharging delay member 31. The voltage at node 23 then substantially assumes ground potential and the switches 15*a*-17*b* of the interruption circuit 38 open.

In some embodiments, the VBUS regulator 38 is a Zener diode. Switch 35 may be a bipolar transistor, e.g., a transistor of the npn-type. The limiter 36 may comprise a resistor provided in conjunction with a bipolar transistor 35. The limiter 36 functions to inhibit excessive currents through the control node of switch 35. Excessive currents may otherwise damage switch 35.

Rectifier 37 inhibits a potential transfer from terminal 5*d* or from terminal 6 to terminal 1*a*. If terminal 1*a* (accidentally) connects to earth, rectifier 37 inhibits electric currents flowing from terminals 5*d* and 6 through limiter 36 in the direction of terminal 1*a*. Rectifier 37 can, by way of non-limiting example, be implemented as a (semiconductor) diode.

In some embodiments, switch 35 is a field effect transistor or a (conventional) relay. These embodiments may dispense with limiter 36.

FIG. 6 also shows switches 39 and 40. The control node of switch 39 connects via limiter 41 to a microcontroller (or similar) supply voltage at terminal 6. If a voltage such as 3.3 V is applied to terminal 6, switch 39 will operate. The control node of switch 40 connects via limiter 42 to VBUS terminal 1*a*. If a voltage such as 5 V is applied to terminal 1*a*, switch 40 will operate.

If both of the switches 39 and 40 operate, the potential at the control (base) terminal of switch 35 will substantially be a function of resistors 43 and 44. Resistors 43 and 44 together form a voltage divider. A first end of this voltage divider connects to terminal 5*d*. A second end of this voltage divider connects to switch 39. The potential at the second end will (substantially) be ground potential if the voltages at terminals 1*a* and 6 are within reasonable limits.

The (ohmic) resistors 43 and 44 then produce a voltage at the control node of switch 35 which inhibits operation of switch 35. In the event of an open switch 39 and/or 40, the control node of switch 35 (substantially) assumes the potential of terminal 5*d*. Switch 35 then operates, thereby discharging delay member 31. Node 23 consequently assumes ground potential so that switches 15*a*-17*b* of the interrupter circuit 8 open.

It is envisioned that at least one of the switches 39 and/or 40 is implemented as a bipolar transistor, preferably as a transistor of the npn-type. Limiters 41 and 42, in conjunction with bipolar transistors, may inhibit excessive currents through the control nodes of switches 39 and 40.

In some embodiments, at least one of the switches 39 and/or 40 is a field-effect transistor or a (conventional) relay. A limiter such as 41 and/or 42 may then no longer be required. The alternate embodiment may dispense with one or both of the limiters 41 and/or 42.

In some embodiments, switch 39 is dispensed with. This does not verify whether a voltage within reasonable limits is applied to terminal 6. A connection along the leads VBUS 1*a*, 1*b*, D− 2*a*, 2*b*, and D+ 3*a*, 3*b* may thus be established without verification of the microcontroller (or similar) voltage through terminal 6.

In some embodiments, switch 40 is dispensed with. This provides limited functionality to verify whether a voltage within reasonable limits is applied to VBUS terminal 1*a*. A connection along the leads VBUS 1*a*, 1*b*, D− 2*a*, 2*b*, and D+ 3*a*, 3*b* may thus be established even though the potential of VBUS terminal 1*a* is 0 V.

In some embodiments, the branch with regulator 38, rectifier 37, and limiter 36 is dispensed with. This provides limited protection against excessive voltages being applied through VBUS terminal 1*a*. A connection along the leads VBUS 1*a*, 1*b*, D− 2*a*, 2*b*, and D+ 3*a*, 3*b* may thus be established even though the potential of VBUS terminal 1*a* is 50 V.

Controller check circuit 10 also provides an optional rectifier 45. Rectifier 45 inhibits potentially dangerous voltages at the control terminal of switch 40. With switch 40 implemented as a bipolar transistor, rectifier 45 inhibits adverse effects of negative voltage drops between the base and the emitter terminals of rectifier 45.

Various appliances may employ a protection circuit taught by the instant disclosure. These include, but are not limited to, fire detectors, room comfort units, integrated modules for room control, gas and/or oil burners, electronic valves, mass flow sensors, cogeneration plants, and/or fuel cells. A protection circuit as taught by the instant disclosure may, in particular, be used to connect a differential pressure sensor (unit) to a controller. A protection circuit as taught by the instant disclosure may also be used to connect a mass flow sensor (unit) to a controller (of a gas burner). A protection circuit according to the present disclosure may further be employed in a heating, air-conditioning, ventilation (HVAC) installation. Also, an installation with a plurality of distributed sensor devices may comprise a protection circuit as taught by the instant disclosure.

Various embodiments may include a first USB VBUS terminal 1a configured to couple to an USB VBUS terminal of a first controller, at least a first USB data terminal 2a, 3a configured to couple to an USB data terminal of a first controller, a second USB VBUS terminal 1b configured to couple to an USB VBUS terminal of a second controller, at least a second USB data terminal 2b, 3b configured to couple to an USB data terminal of a second controller, a VBUS line electrically coupling the first USB VBUS terminal 1a and the second USB VBUS terminal 1b, at least a data line electrically coupling the at least a first USB data terminal 2a, 3a and the at least a second USB data terminal 2b, 3b, at least an interrupter 15a-17b arranged in the VBUS line or in the at least a data line, wherein operation of the at least an interrupter 15a-17b electrically interrupts the VBUS line or the at least a data line, a control circuit 10 with a switch 35, the control circuit 10 being electrically connected to the first USB VBUS terminal 1a and controlling via the switch 35 the at least an interrupter 15a-17b, wherein the switch 35 is operable to generate an interrupt signal to cause operation of the at least an interrupter 15a-17b, wherein the control circuit 10 comprises first branch 35-38, 1a with a breakdown member 38 (itself) defining a first threshold voltage and a second branch 35, 40, 42, 43, 1a with a first comparison member 40, 42 configured to compare a voltage at the first USB VBUS terminal 1a to a second threshold, the two branches connecting to the first USB VBUS terminal 1a.

In some embodiments, the breakdown member 38 connects directly to the first USB VBUS terminal 1a.

In some embodiments, a switch 35, e.g., the same switch 35, will generate an interrupt signal, if
a voltage at the first USB VBUS terminal 1a causes a voltage drop over the breakdown member 38 exceeding the first threshold voltage, or if
a voltage at the first USB VBUS terminal 1a causes a voltage applied to the first comparison member 40, 42 that is less than the second threshold.

The switch 35 may comprise a transistor, in particular a single transistor.

Direct connection between the breakdown member 38 and the first USB VBUS terminal means that no resistors, capacitors, inductors, etc. are arranged in between the breakdown member 38 and the first USB VBUS terminal 1a.

The instant disclosure also teaches the aforementioned protection circuit, wherein the first controller and/or the second controller comprises a step-down converter configured to produce a supply voltage (for the protection circuit), the protection circuit additionally comprising: a supply terminal 6 configured to connect to the step-down converter, the control circuit 10 further comprising: a third branch 6, 41, 39, 43, 35, the third branch 6, 41, 39, 43, 35 being electrically connected to the supply terminal 6, the third branch also comprising a second comparison member 41, 39 configured to compare a voltage applied at the supply terminal 6 to a third threshold, wherein the switch 35 is also operable to generate an interrupt signal, if a voltage at the supply terminal 6 causes a voltage applied to the second comparison member 41, 39 that is less than the third threshold.

The instant disclosure also teaches the aforementioned protection circuit, wherein the second comparison member 39, 41 (itself) defines the third threshold.

The instant disclosure also teaches one of the aforementioned protection circuits additionally comprising: a power terminal 5d configured to connect to a power supply of the first controller and/or to a power supply of the second controller, the control circuit 10 further comprising: a divider circuit 5d, 44, 43, 39, 40, 35, the divider circuit 5d, 44, 43, 39, 40, 35 being electrically connected to the power terminal 5d, the divider circuit 5d, 44, 43, 39, 40, 35 being configured to produce a voltage that is a fraction of a voltage at the power terminal 5d, wherein the switch 35 is also a comparison member configured to compare the voltage produced by the divider circuit 5d, 44, 43, 39, 40, 35 to a fourth threshold, wherein the switch 35 will also close if a voltage at the power terminal 5d causes the divider circuit 5d, 44, 43, 39, 40, 35 to produce a voltage that exceeds the fourth threshold.

The instant disclosure also teaches one of the aforementioned protection circuits, wherein the at least an interrupter 15a-17b is configured to close, and wherein closing the at least an interrupter 15a-17b makes an electrical connection along the VBUS line or along the at least a data line, the protection circuit additionally comprising: at least a power terminal 5a-5c configured to connect to a power supply of the first controller and/or to a power supply of the second controller, a time delay circuit 5a-5c, 32-34, 20b, 21b, 22b, 31 with a delay member 31 and with at least a capacitive member 32-34, the time delay circuit being electrically connected to the at least a power supply terminal 5a-5c, the time delay circuit 5a-5c, 32-34, 20b, 21b, 22b, 31 being configured to produce within a first time delay a fifth threshold voltage 18a-18c that causes the at least an interrupter 15a-17b to close, wherein the first time delay is a function of the delay member 31 and of the at least a capacitive member 32-34.

The instant disclosure also teaches one of the aforementioned protection circuits additionally comprising: a (USB) first GND terminal 4a configured to connect to a GND line of the first controller, at least a second (USB) GND terminal 4b1-4b11 configured to connect to a GND line of the second controller, a GND line electrically coupling the first (USB) GND terminal 4a and the at least a second GND terminal 4b1-4b11, a resettable device 24 arranged in the GND line, wherein the resettable device 24 has a first state and a second state, wherein the impedance of the resettable device 24 in its first state is larger than in its second state, wherein the resettable device 24 is configured to change from its second state to its first state in response to an increase in electric current through the GND line.

The instant disclosure also teaches the aforementioned protection circuit, wherein the GND lines is configured to carry an electric current.

The instant disclosure also teaches one of the two aforementioned protection circuits, the protection circuit additionally comprising: a ground fault detection circuit 9 with at least a second switch 26, 28, the ground fault detection circuit 9 controlling via the at least a second switch 26, 28 the at least an interrupter 15a-17b, wherein the at least an interrupter 15a-17b is configured to electrically interrupt in response to the at least a second switch 26, 28 closing, wherein the resettable device 24 controls the at least a second switch 26, 28 of the ground fault detection circuit 9, wherein the at least a second switch 26, 28 is configured to close in response to the resettable device 24 changing into its first state.

The instant disclosure also teaches one of the three aforementioned protection circuits, wherein the resettable device 24 is configured to change from its first state to its second state in response to a decrease in electric current through the GND line.

The instant disclosure also teaches one of the three aforementioned protection circuits additionally comprising: at least an electrostatic discharge circuit 7a; 7b with an at least a phase end terminal and at least a ground terminal, the at least a phase end terminal connecting to at least one of: the first USB VBUS terminal 1a, the second USB VBUS terminal 1b, the at least a first USB data terminal 2a, 3a, the at least a second USB data terminal 2b, 3b, the at least a ground terminal of the electrostatic discharge circuit 7a, 7b connecting to at least one of: the first (USB) GND terminal 4a the at least a second (USB) GND terminal 4b9; 4b4, 4b5 the electrostatic discharge circuit 7a; 7b additionally comprising a rectifier circuit 11a-11d; 13a-13f connected to the at least a phase end terminal and comprising at least a breakdown member 12; 14a-14b connected to the at least a ground terminal of the electrostatic discharge circuit 7a; 7b, the at least a breakdown member 12; 14a-14b defining a sixth threshold voltage, wherein the rectifier circuit 11a-11d; 13a-13f is configured to produce a rectified voltage in response to a voltage applied to the at least a phase end terminal and is configured to apply the produced rectified voltage to the at least a breakdown member 12; 14a-14b, wherein the at least a breakdown member 12; 14a-14b is configured to change from a first state with a first impedance to a second state with a second impedance, the second impedance being lower than the first impedance, in response to the voltage applied by the rectifier circuit 11a-11d; 13a-13f to the at least a breakdown member 12; 14a-14b exceeding the sixth threshold voltage.

The instant disclosure also teaches the aforementioned protection circuit, the at least an electrostatic discharge circuit 7a additionally comprising: at least another breakdown member 14b, 14a connected to the at least a ground terminal of the electrostatic discharge circuit 7a, the at least another breakdown member 14b, 14a defining (itself) a seventh threshold voltage, wherein the rectifier circuit 13a-13f is configured to produce a rectified voltage in response to a voltage applied to the at least a phase end terminal and is configured to apply the produced rectified voltage to the at least another breakdown member 14b, wherein the at least another breakdown member 14b, 14a is configured to change from a first state with a first impedance to a second state with a second impedance, the second impedance being lower than the first impedance, in response to the voltage applied by the rectifier circuit 13a-13f to the at least a breakdown member 14b, 14a falling below the seventh threshold voltage.

The instant disclosure also teaches the aforementioned protection circuit, wherein the seventh threshold voltage is lower than the sixth threshold voltage.

The instant disclosure also teaches one of the aforementioned protection circuits, wherein the first threshold voltage is larger than the second threshold voltage.

The instant disclosure also teaches one of the aforementioned protection circuits, wherein the switch 35 of the control circuit 10 controls the voltage produced by the time delay circuit 5a-5c, 32-34, 20b, 21b, 22b, 31, wherein the time delay circuit 5a-5c, 32-34, 20b, 21b, 22b, 31 is configured to drop within a second time delay its output voltage to a value below the fifth threshold voltage in response to the switch 35 of the control circuit 10 generating an interrupt signal, wherein the at least an interrupter 15a-17b is configured to electrically interrupt in response to a voltage produced by the time delay circuit 5a-5c, 32-34, 20b, 21b, 22b, 31 that is below the fifth threshold voltage.

The instant disclosure also teaches the aforementioned protection circuit, wherein the second time delay is shorter than the first time delay.

The instant disclosure also teaches one of the two aforementioned protection circuits, wherein the second time delay is independent of the delay member 31 and is independent of the at least a capacitive member 32-34.

The instant disclosure also teaches one of the aforementioned protection circuits, wherein the first comparison member 40, 42 of the control circuit 10 itself defines (a value of) the second threshold.

The first comparison member 40, 42 of the control circuit 10 itself defines (a value of) the second threshold in that (the value of) the second threshold is an inherent characteristic of comparison member 40, 42, in particular an inherent characteristic of transistor 40. That is, transistor 40 opens when the voltage applied to its base terminal is above the second threshold voltage. Transistor 40 closes when the voltage applied to its base terminal is below the second threshold voltage.

The instant disclosure also teaches a system of networked device with the first controller and with the second controller and with an aforementioned protection circuit wherein the first controller provides an USB VBUS terminal and at least an USB data terminal, wherein the second controller provides an USB VBUS terminal and at least an USB data terminal, wherein the first USB VBUS terminal 1a of the protection circuit couples to the USB VBUS terminal of the first controller, wherein the second USB VBUS terminal 1b of the protection circuit couples to the USB VBUS terminal of the second controller, wherein the at least a first USB data terminal 2a, 3a of the protection circuit couples to the at least an USB data terminal of the first controller, wherein the at least a second USB data terminal 2b, 3b of the protection circuit couples to the at least an USB data terminal of the second controller.

In an embodiment, the switch 35 of the control circuit 10 generates an interrupt signal by closing.

According to an aspect, the first threshold voltage is less than 50 V, less than 47 V, or less than 20 V.

According to an aspect, the second threshold is 4 V or less, between 0 V and 4 V, or between 0 V and 3.6 V.

According to an aspect, the third threshold is 5 V or less, between 0 V and 4 V, or between 0 V and 3.3 V such as 1.8 V.

According to an aspect, the fourth threshold is less than 6 V, between 1 V and 4 V, or between 1 V and 3.5 V.

Parts of the circuits or parts of a method according to the present disclosure may be embodied in hardware, in a software module executed by a processor, or by a cloud computer, or by a combination thereof. The software may include a firmware, a hardware driver run in the operating system, or an application program. Thus, the disclosure also relates to a computer program product for performing the operations presented herein. If implemented in software, the functions described may be stored as one or more instructions on a computer-readable medium. Some examples of storage media that may be used include random access memory (RAM), magnetic RAM, read only memory (ROM), flash memory, EPROM memory, EEPROM memory, registers, a hard disk, a removable disk, other optical disks, a Millipede® device, or any available media that can be accessed by a computer or any other IT equipment and appliance.

It should be understood that the foregoing relates only to certain embodiments of the invention and that numerous changes may be made therein without departing the scope of the invention as defined by the following claims. It should also be understood that the invention is not restricted to the illustrated embodiments and that various modifications can be made within the scope of the following claims.

REFERENCE NUMERALS

1a VBUS terminal connecting to the first controller
2a D− terminal connecting to the first controller
3a D+ terminal connecting to the first controller
4a GND terminal connecting to the first controller
1b VBUS terminal connecting to the second controller
2b D− terminal connecting to the second controller
3b D+ terminal connecting to the second controller
4b1-4b11 GND terminals connecting to the second controller.
5a-5d terminals to connect to the supply voltage of the controller
6 terminal to connect to a microprocessor (or similar) supply voltage
7a ESD protection circuit
7b ESD protection circuit
8 interruption circuit
9 ground fault circuit
10 controller check circuit
11a-11d rectifiers of ESD protection circuit 7b
12 shunt regulator of ESD protection circuit 7b
13a-13f rectifiers of ESD protection circuit 7a
14 regulators of ESD protection circuit 7a.
15a, 15b switches of the interrupter circuit 8
16a, 16b switches of the interrupter circuit 8
17a, 17b switches of the interrupter circuit 8
18a Gate electrode(s) for switches 17a, 17b
18b Gate electrode(s) for switches 16a, 16b
18c Gate electrode(s) for switches 15a, 15b
19a, 19b nodes interconnecting interrupter circuit 8 and ground fault circuit 9
20a, 20b; 21a, 21b; 22a, 22b: Diodes of interrupter circuit 8
23 node of the interrupter circuit 8
24 resettable device
25, 27 limiter members
26, 28 switches
29, 30 rectifiers
31 delay member
32-34 resistors
35 switch
36 limiter for switch 35
37 rectifier
38 VBUS regulator
39, 40 switches of check circuit 10
41, 42 limiters for switches 39, 40
43, 44 voltage divider
45 rectifier

The invention claimed is:

1. A protection circuit comprising:
a first USB VBUS terminal configured to couple to an USB VBUS terminal of a first controller;
a first USB data terminal configured to couple to an USB data terminal of a first controller;
a second USB VBUS terminal configured to couple to an USB VBUS terminal of a second controller;
a second USB data terminal configured to couple to an USB data terminal of the second controller;
a VBUS line electrically coupling the first USB VBUS terminal and the second USB VBUS terminal;
a data line electrically coupling the first USB data terminal and the second USB data terminal;
an interrupter arranged in the VBUS line or in the data line, wherein operation of the interrupter electrically interrupts the VBUS line or the data line,
a control circuit with a switch, the control circuit electrically connected to the first USB VBUS terminal and controlling the interrupter, wherein the switch generates an interrupt signal to cause operation of the interrupter;
wherein the control circuit comprises first branch with a breakdown member defining a first threshold voltage and a second branch with a first comparison member to compare a voltage at the first USB VBUS terminal to a second threshold voltage, the two branches connecting to the first USB VBUS terminal wherein the breakdown member connects directly to the first USB VBUS terminal and the switch generates an interrupt signal if:
a voltage at the first USB VBUS terminal causes a voltage drop over the breakdown member exceeding the first threshold voltage, or
a voltage at the first USB VBUS terminal causes a voltage applied to the first comparison member less than the second voltage threshold.

2. The protection circuit according to claim 1, wherein:
the first controller or the second controller comprises a step-down converter configured to produce a supply voltage;
the protection circuit additionally comprises a supply terminal to connect to the step-down converter;
the control circuit further comprises a third branch electrically connected to the supply terminal;
the third branch also comprising a second comparison member to compare a voltage applied at the supply terminal to a third voltage threshold;
wherein the switch generates an interrupt signal if a voltage at the supply terminal causes a voltage applied to the second comparison member that is less than the third voltage threshold.

3. The protection circuit according to claim 1, further comprising:
a power terminal connect to a power supply of either the first controller or the second controller;
the control circuit further comprising a divider circuit electrically connected to the power terminal, the divider circuit configured to produce a voltage that is a predetermined fraction of a voltage at the power terminal;
wherein the switch comprises a comparison member to compare the voltage produced by the divider circuit to a fourth voltage threshold;
wherein the switch generates an interrupt signal if a voltage at the power terminal causes the divider circuit to produce a voltage that exceeds the fourth voltage threshold.

4. The protection circuit according to claim 1, wherein the interrupter is configured to close, and wherein closing the interrupter makes an electrical connection along the VBUS line or along the at least a data line,
the protection circuit additionally comprising:
a power terminal connecting to a power supply of either the first controller or the second controller;
a time delay circuit with a resistive member and a capacitive member, the time delay circuit electrically connected to the at least a power supply terminal;

the time delay circuit configured to produce within a first time delay a fifth threshold voltage that causes the at least an interrupter to close, wherein the first time delay is a function of a resistance of the resistive member and of the at least a capacitive member.

5. The protection circuit according to claim 1, further comprising:
a first GND terminal configured to connect to a GND line of the first controller;
a second GND terminal configured to connect to a GND line of the second controller;
a GND line electrically coupling the first GND terminal and the second GND terminal;
a resettable device arranged in the GND line;
wherein the resettable device has a first state and a second state;
wherein the impedance of the resettable device in its first state is larger than in its second state;
wherein the resettable device is configured to change from its second state to its first state in response to an increase in electric current through the GND line.

6. The protection circuit according to claim 5, the protection circuit additionally comprising:
a ground fault detection circuit with at least a second switch controlling the interrupter, wherein the interrupter is configured to electrically interrupt in response to the second switch closing;
wherein the resettable device controls the second switch of the ground fault detection circuit;
wherein the second switch is configured to close in response to the resettable device changing into its first state.

7. The protection circuit according to claim 5, wherein the resettable device changes from its first state to its second state in response to a decrease in electric current through the GND line.

8. The protection circuit according to claim 5, further comprising:
an electrostatic discharge circuit with a phase end terminal and a ground terminal, the phase end terminal connecting to at least one of: the first USB VBUS terminal, the second USB VBUS terminal, the first USB data terminal, and/or the second USB data terminal;
the ground terminal of the electrostatic discharge circuit connecting to at least one of: the first GND terminal, the second GND terminal,
the electrostatic discharge circuit further comprising a rectifier circuit connected to the phase end terminal and comprising a breakdown member connected to the ground terminal of the electrostatic discharge circuit, the breakdown member defining a sixth threshold voltage;
wherein the rectifier circuit is configured to produce a rectified voltage in response to a voltage applied to the phase end terminal and to apply the produced rectified voltage to the breakdown member;
wherein the breakdown member changes from a first state with a first impedance to a second state with a second impedance, the second impedance lower than the first impedance, in response to the voltage applied by the rectifier circuit to the breakdown member exceeding the sixth threshold voltage.

9. The protection circuit according to claim 8, the electrostatic discharge circuit further comprising:
another breakdown member connected to the ground terminal of the electrostatic discharge circuit, the another breakdown member defining a seventh threshold voltage;
wherein the rectifier circuit is configured to produce a rectified voltage in response to a voltage applied to the phase end terminal and to apply the produced rectified voltage to the another breakdown member;
wherein the another breakdown member changes from a first state with a first impedance to a second state with a second impedance, the second impedance lower than the first impedance, in response to the voltage applied by the rectifier circuit to the another breakdown member falling below the seventh threshold voltage.

10. The protection circuit according to claim 1, wherein the first threshold voltage is larger than the second threshold voltage.

11. The protection circuit according to claim 4, wherein the switch of the control circuit controls a voltage produced by the time delay circuit;
wherein the time delay circuit drops within a second time delay its output voltage to a value below the fifth threshold voltage in response to the switch of the control circuit generating an interrupt signal;
wherein the interrupter electrically interrupts in response to a voltage produced by the time delay circuit that is below the fifth threshold voltage.

12. The protection circuit according to claim 11, wherein the second time delay is shorter than the first time delay.

13. The protection circuit according to claim 11, wherein the second time delay is independent of the resistive member and is independent of the capacitive member.

14. The protection circuit according to claim 1, wherein the first comparison member of the control circuit itself defines the second threshold.

15. A system of networked devices, the system comprising:
a first controller with a USB VBUS terminal and a USB data terminal;
a second controller with a USB VBUS terminal and a USB data terminal; and
a protection circuit comprising:
a first USB VBUS terminal couple to the USB VBUS terminal of the first controller;
a first USB data terminal coupled to the USB data terminal of the first controller;
a second USB VBUS terminal coupled to the USB VBUS terminal of the second controller;
a second USB data terminal coupled to the USB data terminal of the second controller;
a VBUS line electrically coupling the first USB VBUS terminal and the second USB VBUS terminal;
a data line electrically coupling the first USB data terminal and the second USB data terminal;
an interrupter arranged in the VBUS line or in the data line, wherein operation of the interrupter electrically interrupts the VBUS line or the data line;
a control circuit with a switch, the control circuit electrically connected to the first USB VBUS terminal and controlling the interrupter, wherein the switch generates an interrupt signal to cause operation of the interrupter;
wherein the control circuit comprises a first branch with a breakdown member defining a first threshold voltage and a second branch with a first comparison member to compare a voltage at the first USB VBUS terminal to a second threshold voltage, the two branches connecting to the first USB VBUS terminal wherein the breakdown member connects directly to the first USB VBUS terminal and the switch generates an interrupt signal if:
a voltage at the first USB VBUS terminal causes a voltage drop over the breakdown member exceeding the first threshold voltage, or
a voltage at the first USB VBUS terminal causes a voltage applied to the first comparison member less than the second voltage threshold.

* * * * *